US009183420B1

(12) United States Patent
Heiskanen et al.

(10) Patent No.: US 9,183,420 B1
(45) Date of Patent: Nov. 10, 2015

(54) READER FOR ELECTRONIC CARDS (71) Applicant: Nokia Corporation, Espoo (FI)

(72) Inventors: Juuso Heiskanen, Kaarina (FI); Nick Gillett, San Rafael, CA (US); Jose Melgoza, Chula Vista, CA (US); Thomas Malphus, La Jolla, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/310,464

(22) Filed: Jun. 20, 2014

(51) Int. Cl.
*G06K 7/06* (2006.01)
*G06K 7/00* (2006.01)

(52) U.S. Cl.
CPC ............ *G06K 7/0043* (2013.01); *G06K 7/0026* (2013.01); *G06K 7/0073* (2013.01)

(58) Field of Classification Search
CPC .......... G06K 19/077; G06K 19/07732; G06K 19/07741
USPC .......................................... 235/441, 439, 453
See application file for complete search history.

(56) References Cited

U.S. PATENT DOCUMENTS 6,189,786 B1 * 2/2001 Itou et al. ...................... 235/379
6,454,164 B1 * 9/2002 Wakabayashi et al. ....... 235/380
2005/0208815 A1 9/2005 Tsai ............................... 439/329
2014/0078660 A1 3/2014 Dondzik et al. .......... 361/679.31

FOREIGN PATENT DOCUMENTS

DE 102006019630 A1 10/2007
JP 2003132976 A 5/2003
WO WO-2007/114591 A1 10/2007

OTHER PUBLICATIONS

"Combined micro SD and SIM card connector"; Retrieved from the Internet on Mar. 31, 2014; http://www.directindustry.com/prod/japan-aviation-electronics-industries/combined-micro-sd-sim-card-connectors-34698- 899177.html; whole document (18 pages).
"Removable Memory Products"; Retrieved from the Internet on Mar. 31, 2014; http://ww.te.com/catalog/pn/en/2199003-2?RQPN=2199003-2#features; whole document (2 pages).

* cited by examiner

*Primary Examiner* — Seung Lee
(74) *Attorney, Agent, or Firm* — Harrington & Smith (57) ABSTRACT

An apparatus comprises a tray and a reader. The tray is configured to hold a first card and a second card in a stacked configuration with contact pads on the first card and contact pads on the second card facing the same direction. The reader has a first set of contacts for engaging contact pads on the first card and a second set of contacts for engaging contact pads on the second card. The first set of contacts and the second set of contacts extend from a first side of the reader. A second side of the reader is mountable to a printed wire board.

20 Claims, 12 Drawing Sheets

READER FOR ELECTRONIC CARDS

BACKGROUND

1. Technical Field

The exemplary and non-limiting embodiments described herein relate generally to card readers in electronic devices and, more particularly, to a card reader capable of accommodating electronic cards such as a subscriber identity module (SIM) card, a memory card, or both a SIM card and a memory card.

2. Brief Description of Prior Developments

Electronic devices such as cellular phones generally employ subscriber identity modules (SIMs) to store information pertaining to particular user accounts associated with particular devices. Some information stored on a SIM is used by a communication network to configure and control user access through the communication network. Other information can be collected from the electronic device (e.g., in the form of digital photos from a camera connected to the device) and stored on the SIM. However, SIMS are generally limited in the amount of data that can be stored thereon. Because additional storage space is often desired, secondary memory devices such as secure device (SD) cards are used in conjunction with the SIMs.

SUMMARY

The following summary is merely intended to be exemplary. The summary is not intended to limit the scope of the claims.

In accordance with one aspect, an apparatus comprises a tray and a reader. The tray is configured to hold a first card and a second card in a stacked configuration with contact pads on the first card and contact pads on the second card facing the same direction. The reader has a first set of contacts for engaging contact pads on the first card and a second set of contacts for engaging contact pads on the second card. The first set of contacts and the second set of contacts extend from a first side of the reader, and a second side of the reader is mountable to a printed wire board.

In accordance with another aspect, a method comprises inserting one or more of a first card and a second card into a tray of a reader in a stacked configuration, the reader having contacts extending from a first side and configured to engage contact pads on the one or more of the first card and the second card, the contact pads on the one or more of the first card and the second card facing the same direction, and the reader having a second side mounted to a printed wire board; and reading one or more of the first card and the second card using a controller having a processor and a memory.

In accordance with another aspect, a tray is configured to be coupled to a card reader. The tray is configured to hold a first electronic card and a second electronic card in a stacked configuration with contact pads on the first and second electronic cards facing the same direction. The contact pads of the first electronic card are configured to be coupled to a first set of contacts of the card reader, and the contact pads of the second electronic card are configured to be coupled to a second set of contacts of the card reader.

BRIEF DESCRIPTION OF THE DRAWINGS

The foregoing aspects and other features are explained in the following description, taken in connection with the accompanying drawings, wherein.

DETAILED DESCRIPTION OF EMBODIMENT

Referring to the Figures herein, exemplary embodiments of a single tray card reader capable of reading either or both SIM (subscriber identity module) cards and memory cards (such as SD (secure digital) cards) are illustrated. When the memory cards are SD cards, the SD cards may be standard SD cards, mini-SD cards, micro-SD cards, or any other type of non-volatile memory storage card. The memory cards may also be of different sizes as compared to the SIM cards. Such embodiments allow for the reduction of space on printed wire boards (PWBs) of electronic devices (e.g., cellular phones, tablets, cameras, or any type of mobile device) employing these cards. Although the features of these single tray card readers will be described with reference to the example embodiments shown in the drawings, it should be understood that other features can be embodied in many alternate forms of embodiments. In addition, any suitable size, shape, or type of elements or materials could be used.

Figure 1A:
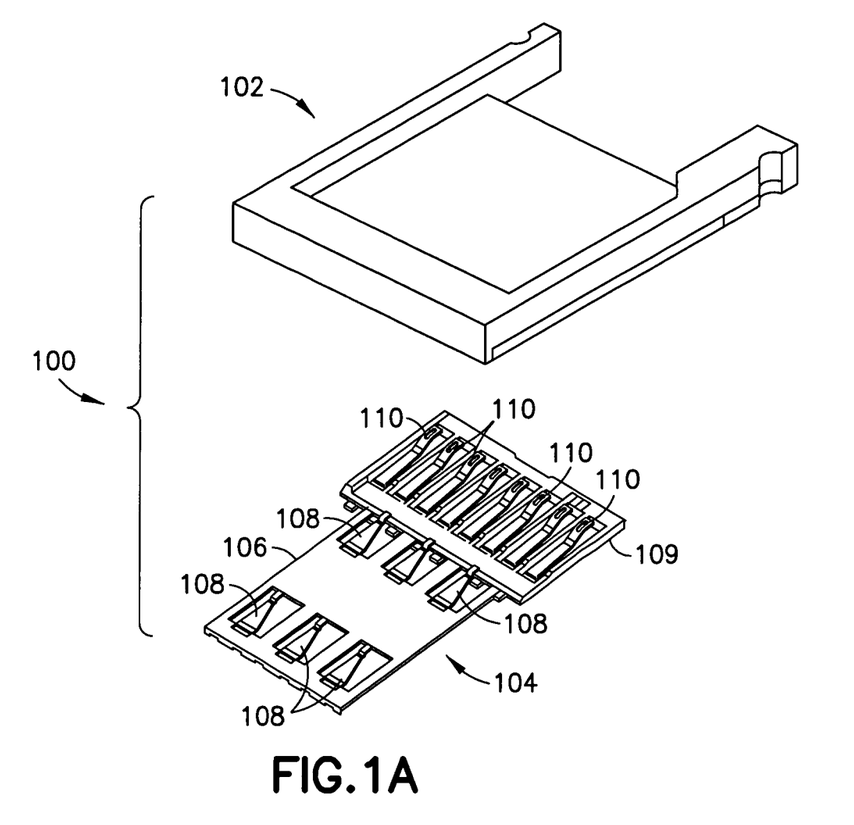
FIG. 1A is an exploded perspective view of one exemplary embodiment of a tray card reader.

Referring to FIG. 1A, one exemplary type of a single tray card reader is designated generally by the reference number 100 and is hereinafter referred to as "tray card reader 100." Tray card reader 100 comprises a tray 102 and a reader 104 configured to read both SIM cards and SD cards in a stacked configuration, the reader 104 being directly mountable to the PWB. Area on the PWB taken up by the reader 104 is typically not greater than the area defined by the length and width of the tray 102.

Figure 1B:
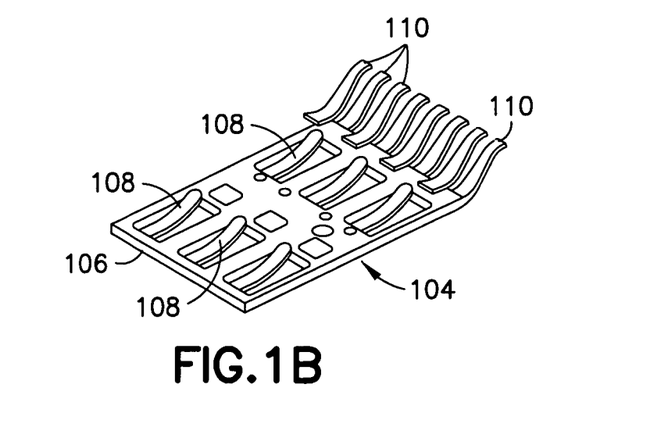
FIG. 1B is a perspective view of one exemplary embodiment of a reader of the tray card reader of FIG. 1A.

As shown in FIGS. 1A and 1B, the reader 104 is a substantially planar member 106 having first contacts 108 for engaging contact pads on the SIM card and a plurality of second contacts 110 for engaging contact pads on the SD card. The second contacts 110 may be formed along an edge of the planar member 106, as shown in FIG. 1B. As shown in FIG. 1A, a bezel 109 or the like may be located around the second contacts 110 to facilitate mounting of the tray 102 relative to the reader 104. The first contacts 108 and the second contacts 110 comprise prongs that extend from one side of the planar member 106, allowing the SIM card and the SD card to be stacked in the tray 102 on the side of the planar member 106 from which the prongs extend and further allowing the opposing side of the planar member 106 to be mounted directly to the PWB. The prongs are cut or otherwise formed and bent upward out of the plane of the planar member 106, which is made of metal, alloy, or other conductive material such as graphene. The extent to which the second contacts 110 extend out of the plane defined by the planar member 106 limits the distance that the tray 102 can be positioned away from the planar member 106.

Figure 2:
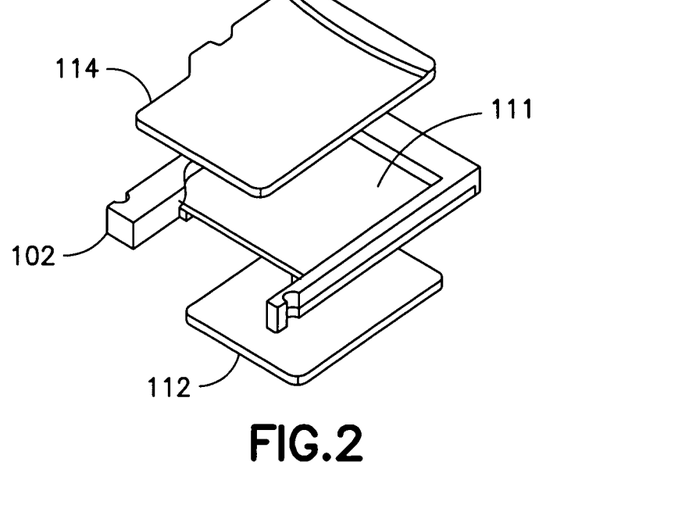
FIG. 2 is a top exploded perspective view of one exemplary embodiment of a tray with a SIM card and an SD card.
Figure 3A:
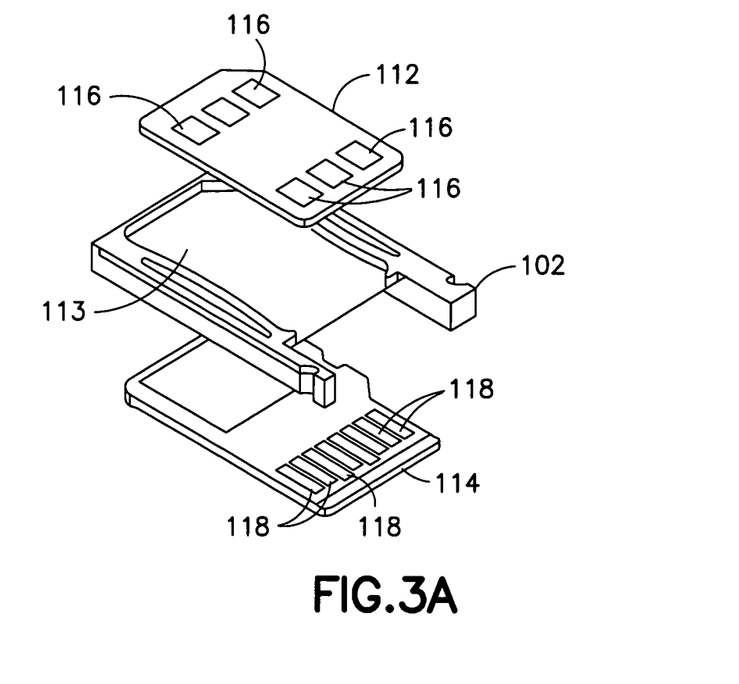
FIG. 3A is a bottom exploded perspective view of the tray, SIM card, and SD card of FIG. 2.
Figure 3B:
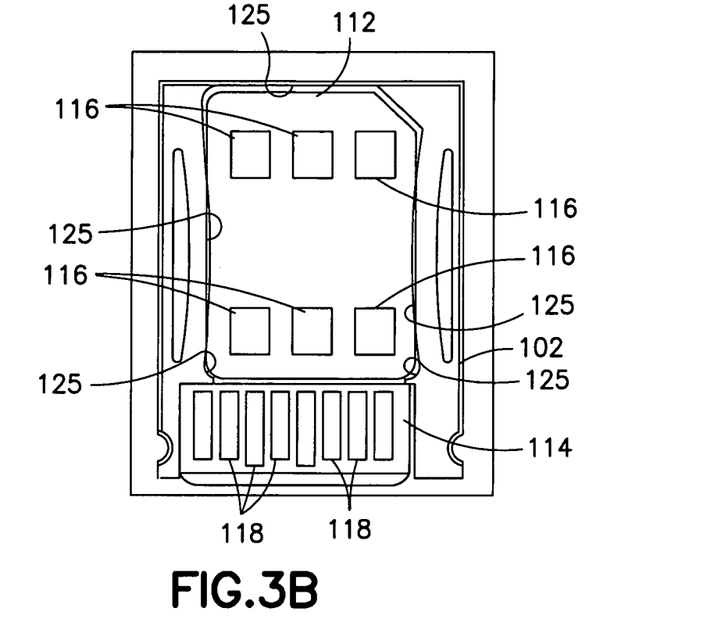
FIG. 3B is a bottom view of the SIM card and the SD card in the tray of FIG. 2.
Figure 3C:
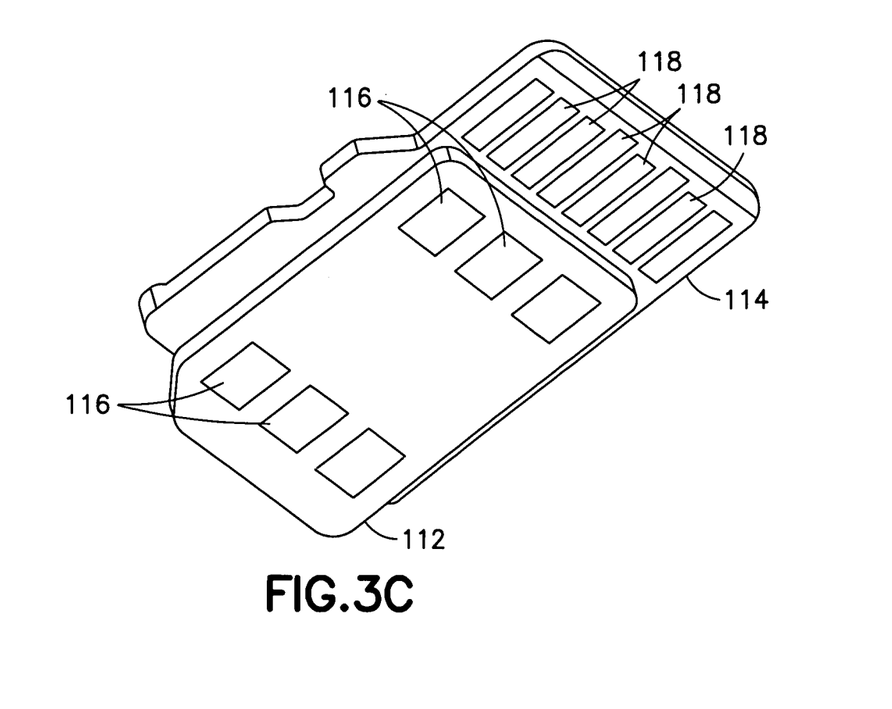
FIG. 3C is a bottom perspective view of the SIM card and the SD card.

Referring to FIGS. 2 and 3A through 3C, one or both of the SIM card (shown at 112) and the SD card (shown at 114) are positioned on opposite faces of the tray 102 with the SD card 114 being positioned on an upper face 111 of the tray 102 and the SIM card 112 being positioned on a lower face 113 of the tray 102. The reader 104 (not shown in FIGS. 2 and 3A through 3C) is positioned below the SIM card 112 such that the first contacts 108 engage the contact pads on the underside of the SIM card 112 and further such that the second contacts 110 engage the contact pads on the underside of the SD card 114. As shown in FIGS. 3A through 3C, the contact pads (shown at 116) on the SIM card 112 and the contact pads (shown at 118) on the SD card 114 face the same direction, which means that reader contacts for the contact pads 116 and the contact pads 118 can be positioned on one surface of the PWB, thus allowing for a single card reading apparatus as opposed to two card reading apparatuses. As shown in FIG. 3B, the SIM card 112 is retained in the tray 102 due to frictional engagement of edges of the SIM card 112 with wall portions of the tray 102 at retention points 125. As can be seen in FIGS. 3B and 3C (shown without the tray 102 for clarity), when the SIM card 112 and the SD card 114 are mounted in the tray 102, the contact pads 118 on the SD card 114 are not obscured by the contact pads 116 on the SIM card 112.

In an alternative embodiment both cards may be on the same side of the tray in a stacked arrangement; the cards can be located in the same recess of the tray and arranged so that the contact pads 116 and 118 are not overlapping. In such an embodiment the larger of the two cards, for example the SD card 114 would be placed or slid in the recess first and then the smaller card, for example the SIM card would be placed or slid in the recess. Such an arrangement would have one of the cards being located between the tray and the other card. Such an arrangement may prove of benefit if the tray is slid into a portable electronic device with the contact pads of the cards facing upwards, i.e. away from the planar element such that both cards are supported by the planar element as the tray is slid into the portable device. The cards may further be supported by a wall around the perimeter of the planar element and/or a fastening element to ensure they are retained by the tray.

Referring now to FIGS. 4A through 4E, one exemplary embodiment of the tray 102 includes a planar portion 120 having at least one wall 122 extending along a portion of the edge of the planar portion 120, the SIM card 112 and the SD card 114 being locatable in the tray 102 on opposing sides of the planar portion 120.

Figure 4A:
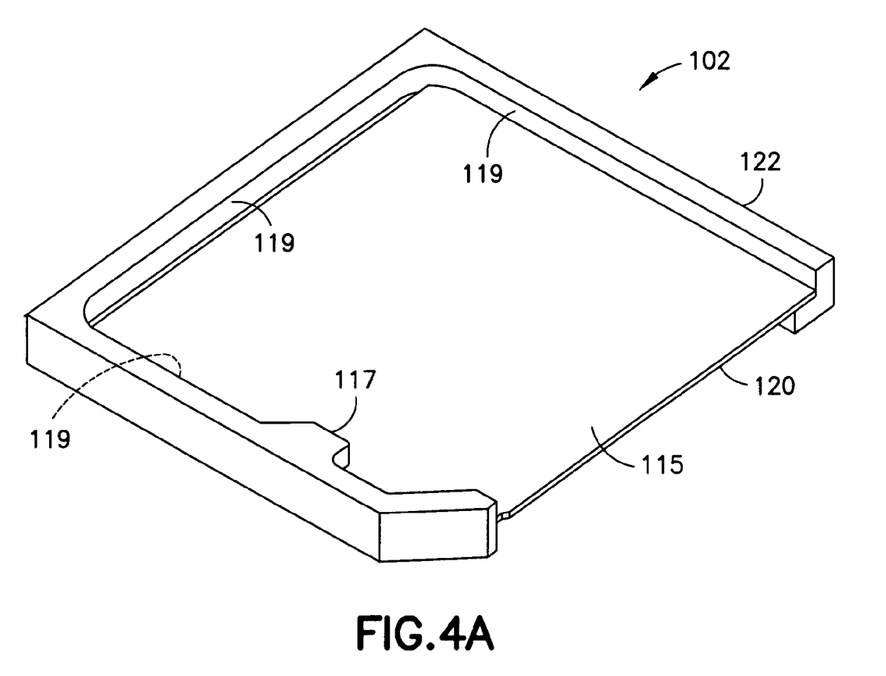
FIG. 4A is a top perspective view of another exemplary embodiment of a tray of the tray card reader.
Figure 4B:
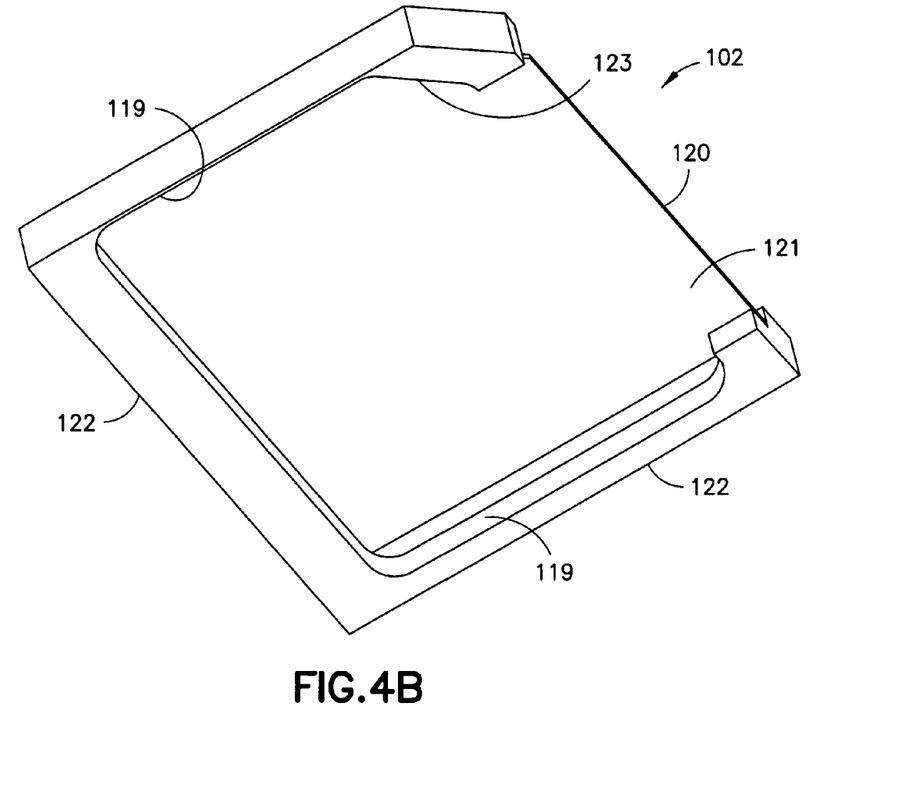
FIG. 4B is a bottom perspective view of the tray of FIG. 4A.

As shown in FIGS. 4A and 4B, the wall 122 extends along three edges of the planar portion 120 and not along a fourth edge, thereby defining an opening along the fourth edge. As can be seen in FIG. 4A, at least a portion of the wall 122 is configured to correspond to an edge of the SD card 114. For example, at least a portion of the wall 122 on a side 115 of the planar portion 120 at which the SD card 114 is received includes protrusions 117 or the like that extend from an inner-facing surface 119 of the wall 122 to engage corresponding features located along edge(s) of the SD card 114.

As can be seen in FIG. 4B, the inner-facing wall 119 on a side 121 of the planar portion 120 at which the SIM card 112 is received may be similarly configured. For example, at least a portion of the wall 122 on the SIM card side 121 may also include an angled surface 123 or the like to correspond to an angled edge of the SIM card 112.

Figure 4C:
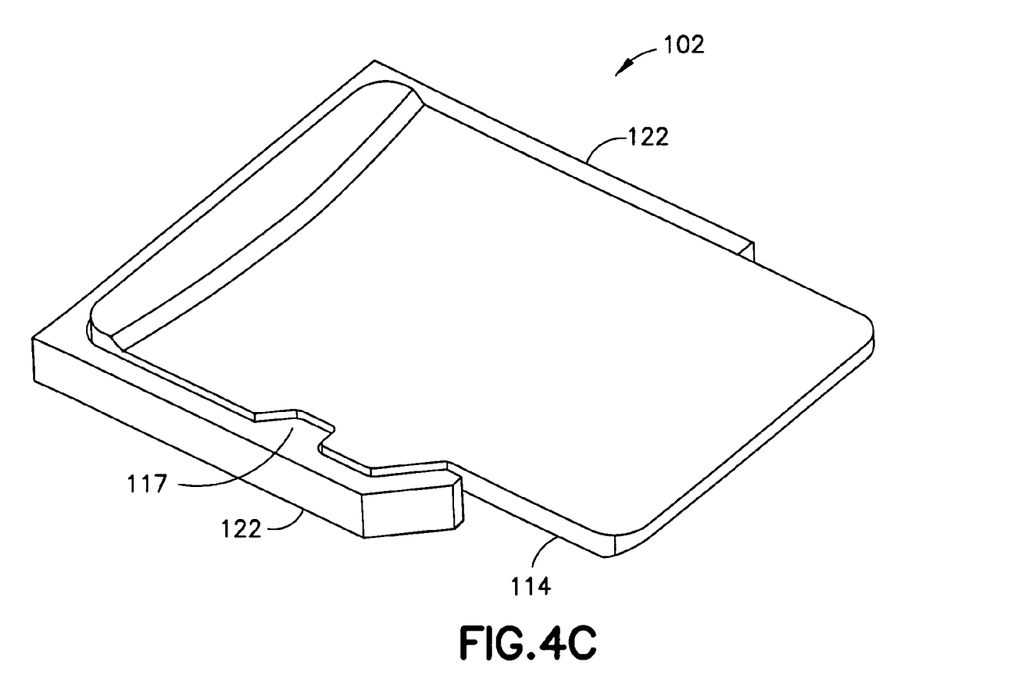
FIG. 4C is a top perspective view of the tray of FIG. 4A with an SD card located therein.

As shown in FIG. 4C, when an SD card 114 is inserted into the tray 102, the protrusions 117 engage edge(s) of the SD card 114, thereby increasing the likelihood that the SD card 114 is inserted into the tray 102 with the proper orientation.

Figure 4D:
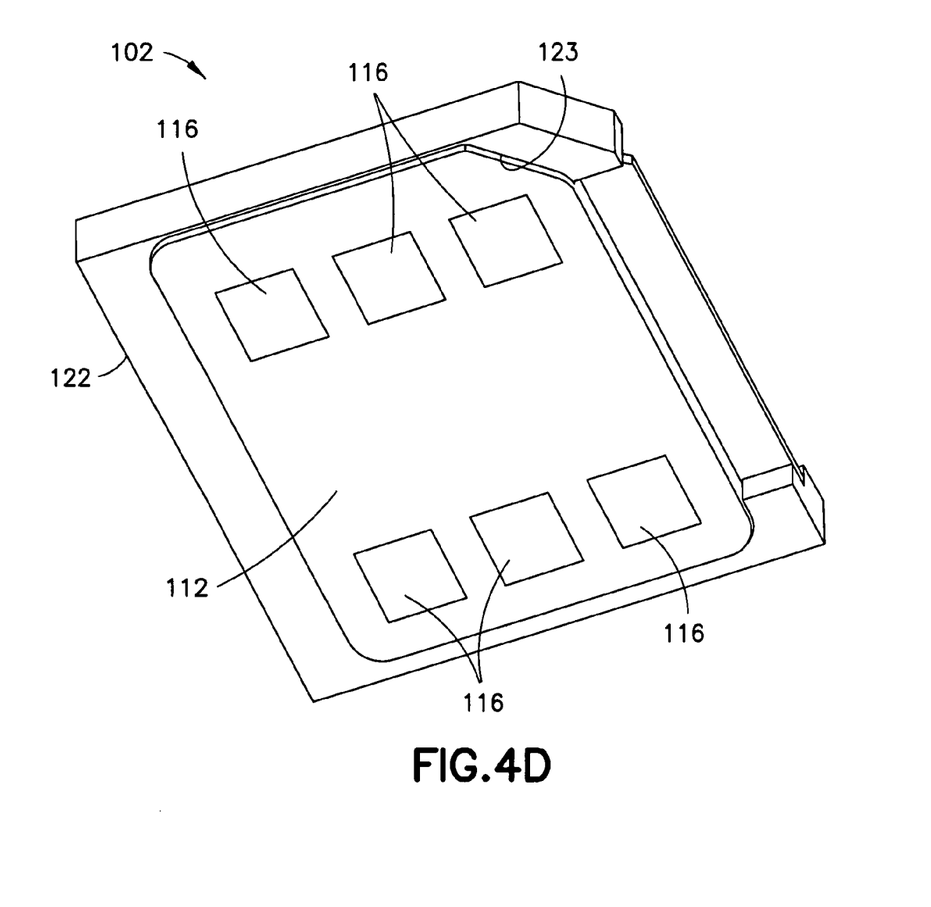
FIG. 4D is a bottom perspective view of the tray of FIG. 4B with a SIM card located therein.

As shown in FIG. 4D, when the SIM card 112 is loaded into the tray 102, the angled surface 123 engages the SIM card 112, thereby increasing the likelihood that the SIM card 112 is inserted into the tray 102 with the proper orientation (contact pads 116 facing away from the tray 102 for engagement by the first contacts 108 on the reader 104).

Figure 4E:
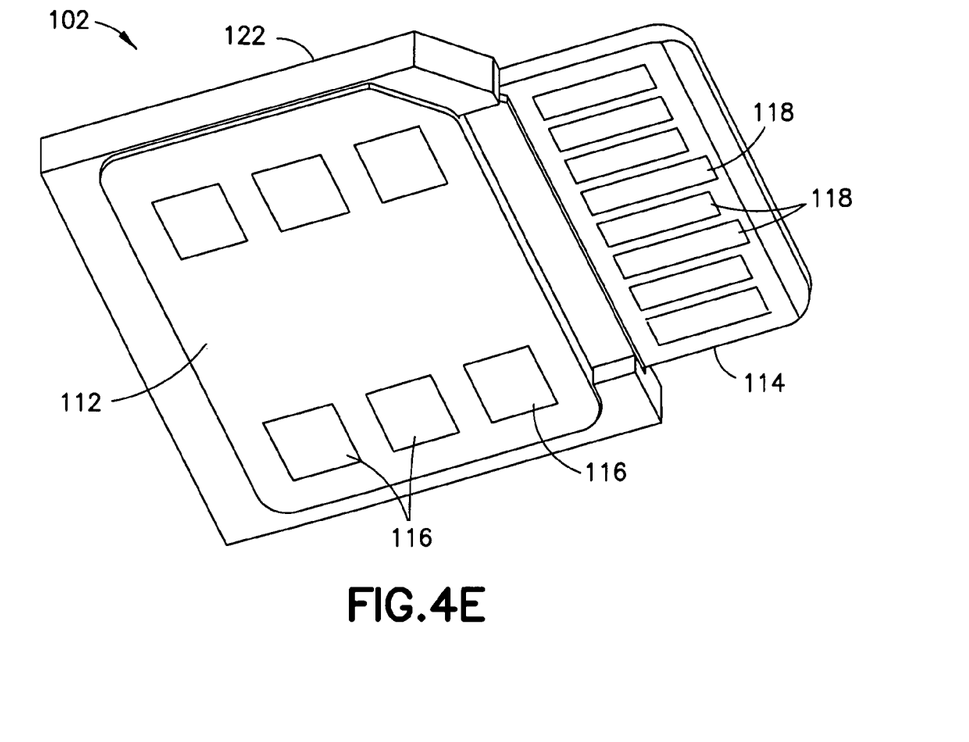
FIG. 4E is a bottom perspective view of the tray with both an SD card and a SIM card located therein.

As shown in FIG. 4E, when the SD card 114 and the SIM card 112 are located in the tray 102, the SD card 114 extends off the fourth edge of the tray 102 such that both the contact pads 116 and the contact pads 118 can be engaged by the first contacts 108 and the second contacts 110, respectively.

It is appreciated that the orientation of the SIM card may be 90, 180 or 270 degrees different to that shown in FIGS. 4D and 4E.

In an exemplary embodiment the planar portion 120 may extend so that it is similarly dimensioned in size to the card it is supporting. The planar portion will then have an aperture corresponding to the contacts 118 of the card through which the contacts 110 of the reader may engage the contacts 118.

With regard to the exemplary embodiments illustrated in FIGS. 2 and 3A, the SIM card 112 and the SD card 114 (or other memory card) may be slid into position in the tray 102. With regard to the exemplary embodiments illustrated in FIGS. 4A through 4E, the SIM card 112 may be placed into position in the tray 102 from a direction normal to the face of the tray 102 while the SD card 114 is slid into position in the tray 102 through the opening at the fourth edge of the tray 102.

Figure 5A:
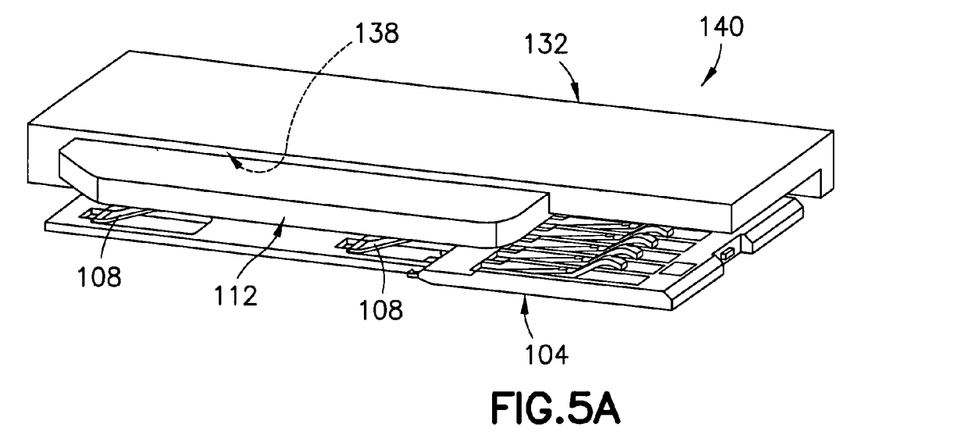
FIG. 5A is a perspective cutaway view of a tray and SIM card with a reader.
Figure 5B:
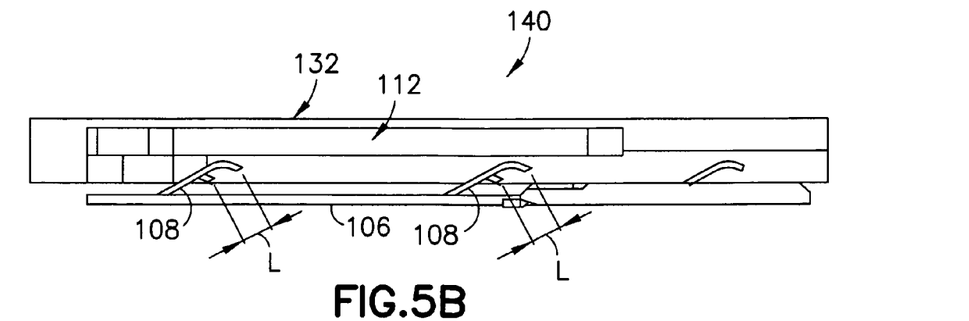
FIG. 5B is a side sectional view of the tray and SIM card and reader of FIG. 5A.

Referring to FIGS. 5A and 5B, one exemplary type of tray card reader employing a tray 132 having a recessed portion 138 in a SIM card-receiving surface of the tray 132 is designated generally by the reference number 140 and is hereinafter referred to as "tray card reader 140." Tray card reader 140 is capable of receiving either a SIM card 112 or an SD card 114, but not both types of cards at the same time. For clarity only the SIM card 112 is shown and it will be appreciated that a further card can be inserted into the tray 132. As can be seen in FIG. 5A, when the SIM card 112 is positioned in the recessed portion 138 of the tray 132 and the reader 104 is made to engage the SIM card 112, the first contacts 108 engage the contact pads 116 on the SIM card 112. As shown in FIG. 5B, in the tray card reader 140, the first contacts 108 are longer (as compared to the first contacts 108 used in tray card reader 100) by a length L in order to accommodate mounting the SIM card 112 in the recessed portion 138. The tray 132 may also be longer in the direction in which the first contacts 108 extend in order to accommodate the increased lengths of the first contacts 108. In the alternative, if the tray 132 is not extended, the first contacts 108 may extend upwards from the substantially planar member 106 at an increased angle.

Figure 6:
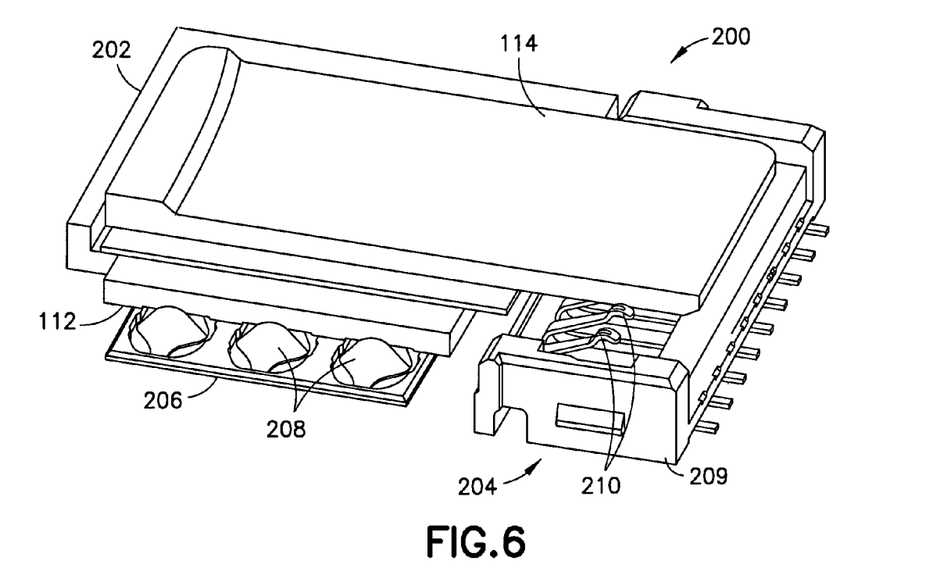
FIG. 6 is a top perspective sectional view of the tray card reader with a SIM card and an SD card positioned therein.
Figure 7:
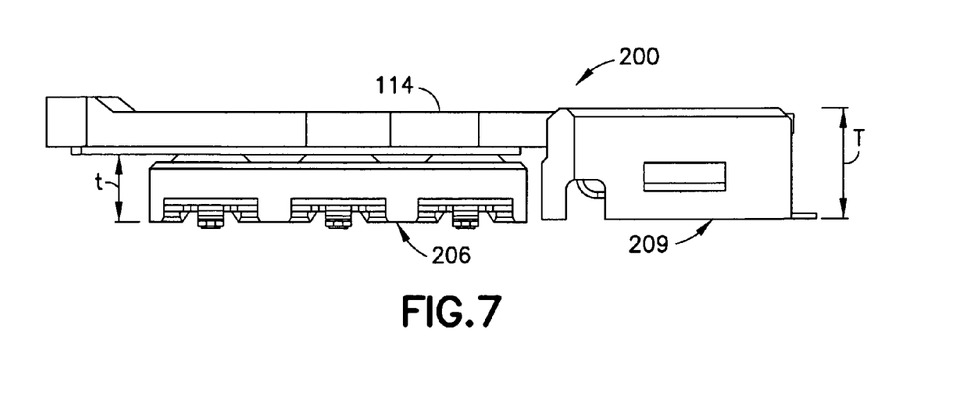
FIG. 7 is a side view of the tray card reader.

Referring to FIGS. 6 through 7, another exemplary embodiment of a single tray card reader is designated generally by the reference number 200 and is hereinafter referred to as "tray card reader 200."

In the tray card reader 200, the reader 204 comprises a SIM card contact housing 206 having first contacts 208 for engaging contact pads on the SIM card and a housing 209 coupled to or integral with the reader 204, the housing 209 being substantially thicker than the bezel 109 and accommodating second contacts 210 for engaging contact pads on the SD card. The first contacts 208 are substantially hemispherically-shaped elements integrally formed with the SIM card contact housing 206 or welded, bonded, or otherwise coupled to the SIM card contact housing 206 such that the reader 204 (and the entire tray card reader 200) is thicker than the reader 104 of the tray card reader 100. Similar to the reader 104 of the tray card reader 100, the second contacts 210 in the housing 209 may be positioned along an edge of the SIM card contact housing 206. Because the reader 204 of the tray card reader 200 is thicker as compared to the reader 104 of the tray card reader 100, the second contacts 210 are bent upwards at a greater angle than the second contacts 110 of the reader 104 and are therefore shorter than the second contacts 110.

Referring now to FIG. 7, a thickness t of the SIM card contact housing 206 is about 1.3 mm, and an overall thickness T of the tray card reader 200 (which substantially corresponds to the thickness of the SD housing 209) is about 2.7 mm.

Figure 8A:
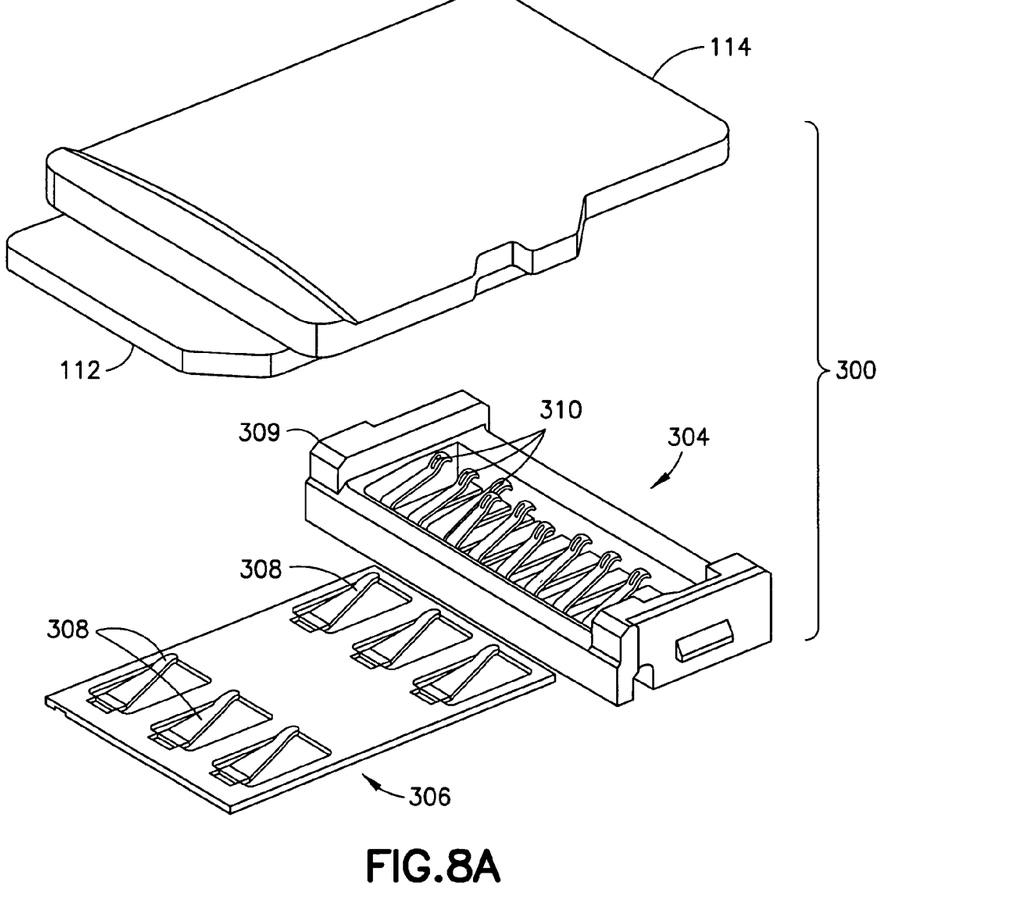
FIG. 8A is an exploded perspective view of another exemplary embodiment of a reader in which contacts for engaging contact pads on an SD card are positioned in a housing.
Figure 8B:
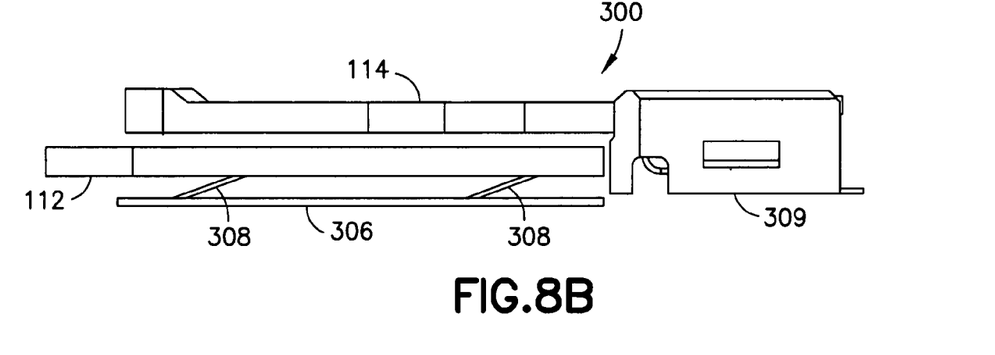
FIG. 8B is a side sectional view of the reader of FIG. 8A.

Referring now to FIGS. 8A and 8B, one exemplary embodiment of a combination of the reader 104 of the tray card reader 100 and the reader 204 of the tray card reader 200 is designated generally by the reference number 304 and is hereinafter referred to as "combination reader 304." Combination reader 304, which can be used with both the SIM card 112 and the SD card 114 simultaneously in a stacked configuration 300 as shown in FIG. 8A, comprises a substantially planar member 306 having first contacts 308 for engaging contact pads on the SIM card 112 as well as second contacts 310 positioned in a housing 309 coupled to or integral with the substantially planar member 306, the second contacts 310 being configured to engage contact pads on the SD card 114. An overall thickness of the combination reader 304 is about 2.0 mm. The combination reader 304 occupies substantially the same amount of space on a PWB as either the tray card reader 100 or the tray card reader 200. As shown in FIG. 8B, the portion of the SD card 114 on which the contact pads 118 are located are received in the housing 309 to allow for contact with the second contacts 310. The tray is not shown in configuration 300.

Figure 9:
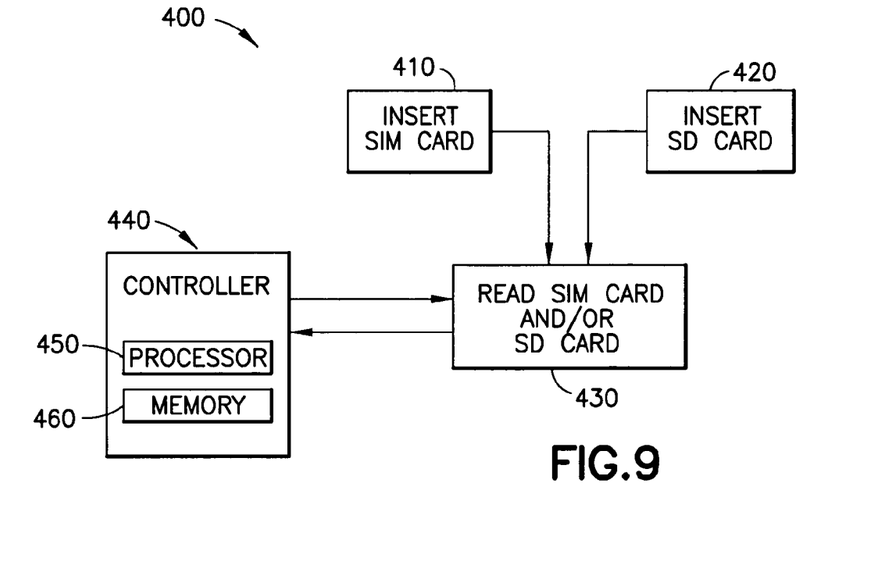
FIG. 9 is a flowchart of one exemplary embodiment of a method of using a tray card reader.

Referring now to FIG. 9, one exemplary embodiment of a method of reading one or both a SIM card 112 and an SD card 114 from a single tray card reader is designated generally by the reference number 400 and is hereinafter referred to as "method 400." In method 400, a SIM card 112 may be inserted into a tray card reader 100, 200 (or any tray card reader comprising combination reader 304) in a SIM card insertion step 410. Additionally or alternatively, an SD card 114 may be inserted into the tray card reader 100, 200 in an SD card insertion step 420. In a read step 430, one or more of the SIM card 112 and the SD card 114 may be read using a controller 440 having a processor 450 and a memory 460. Data may be transferred between the memory 460 and either or both the SIM card 112 and the SD card 114.

In one exemplary embodiment, an apparatus comprises a tray and a reader. The tray is configured to hold a first card (e.g., a SIM card) and a second card (e.g., an SD card) in a stacked configuration with contact pads on the first card and contact pads on the second card facing the same direction. The reader has a first set of contacts for engaging contact pads on the first card and a second set of contacts for engaging contact pads on the second card. The first set of contacts for engaging contact pads on the first card and the second set of contacts for engaging contact pads on the second card extend from a first side of the reader, and a second side of the reader is mountable to a printed wire board.

The reader may comprise a planar member from which the first set of contacts and the second set of contacts extend. The first set of contacts may be cut from the planar member and bent out of a plane of the planar member, and the second set of contacts may be cut from an edge of the planar member and bent out of the plane of the planar member. The first set of contacts may comprise hemispherically-shaped members coupled to or integrally formed with the planar member. The planar member may be metal, alloy, or graphene. The tray may comprise a planar portion having a wall extending along less than the entire edge thereof, a portion of the planar portion not having the wall defining an opening in which the second card can be inserted. At least a portion of the wall may be configured to correspond with an edge of the first card. The planar portion may include a recess in which the first card may be positioned. The tray may comprise a means for aligning one or more of the first card and the second card in the tray. The means for aligning one or more of the SIM card and the SD card in the tray may comprise a spring element at or on the wall. The spring element may be an elastomeric material. An electronic device may include the apparatus. The electronic device may be any of a mobile phone, a tablet, a communications device, or a camera.

In another exemplary embodiment, a method comprises inserting one or more of a first card and a second card into a tray of a reader in a stacked configuration, the tray having contacts extending from a first side and configured to engage contact pads on the one or more of the first card and the second card, the contact pads on the one or more of the first card and the second card facing the same direction, and the reader having a second side mounted to a printed wire board; and reading one or more of the first card and the second card using a controller having a processor and a memory. The method may further comprise transferring data between the memory and one or more of the first card and the second card.

In another exemplary embodiment, a tray is configured to be coupled to a card reader. The tray is configured to hold a first electronic card and a second electronic card in a stacked configuration with contact pads on the first and second electronic cards facing the same direction. The contact pads of the first electronic card are configured to be coupled to a first set of contacts of the card reader, and the contact pads of the second electronic card are configured to be coupled to a second set of contacts of the card reader.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. An apparatus, comprising:
   a tray configured to hold a first card and a second card in a stacked configuration with contact pads on the first card and contact pads on the second card facing the same direction; and
   a reader having a first set of contacts for engaging contact pads on the first card and a second set of contacts for engaging contact pads on the second card;
   wherein the first set of contacts for engaging contact pads on the first card and the second set of contacts for engaging contact pads on the second card extend from a first side of the reader, and wherein a second side of the reader is mountable to a printed wire board, and wherein the tray is configured to be slideable in the apparatus.

2. The apparatus of claim 1, wherein the reader comprises a planar member from which the first set of contacts and the second set of contacts extend.

3. The apparatus of claim 2, wherein the first set of contacts are cut from the planar member and bent out of a plane of the planar member, and wherein the second set of contacts are cut from an edge of the planar member and bent out of the plane of the planar member.

4. The apparatus of claim 2, wherein the first set of contacts comprise hemispherically-shaped members coupled to or integrally formed with the planar member.

5. The apparatus of claim 2, wherein the planar member comprises metal, alloy, or graphene.

6. The apparatus of claim 1, wherein the tray comprises a planar portion having a wall extending along less than the entire edge thereof, a portion of the planar portion not having the wall defining an opening in which the second card can be inserted.

7. The apparatus of claim 6, wherein at least a portion of the wall is configured to correspond with an edge of the first card.

8. The apparatus of claim 6, wherein the planar portion includes a recess in which the first card may be positioned.

9. The apparatus of claim 6, wherein the tray comprises a means for aligning one or more of the first card and the second card in the tray.

10. The apparatus of claim 9, wherein the means for aligning one or more of the first card and the second card in the tray comprises a spring element at or on the wall.

11. The apparatus of claim 10, wherein the spring element comprises an elastomeric material.

12. The apparatus of claim 1, wherein the apparatus comprises an electronic device.

13. The apparatus of claim 12, wherein the electronic device is any of a mobile phone, a tablet, a communications device, or a camera.

14. A method, comprising:
   inserting one or more of a first card and a second card into a tray of a reader in a stacked configuration, the reader having contacts extending from a first side and configured to engage contact pads on the one or more of the first card and the second card, the contact pads on the one or more of the first card and the second card facing the same direction, and the reader having a second side mounted to a printed wire board;
   sliding the tray into an electronic device; and
   reading one or more of the first card and the second card using a controller having a processor and a memory.

15. The method of claim 14, further comprising transferring data between the memory and one or more of the first card and the second card.

16. A tray configured be coupled to a card reader, said tray configured to hold a first electronic card and a second electronic card in a stacked configuration with contact pads on the first and second electronic card facing the same direction wherein the contact pads of the first electronic card are configured to be coupled to a first set of contacts of the card reader and the contact pads of the second electronic card are configured to be coupled to a second set of contacts of the card reader, wherein the tray is configured to be slideably engageable to an electronic device.

17. The tray according to claim 16 wherein the tray comprises a first surface and a second surface and the first electronic card is adjacent a first surface and the second electronic card is adjacent a second surface.

18. The tray according to claim 16 wherein the tray has an aperture and contact pads of the second electronic card and configured to be aligned with said aperture.

19. The tray according to claim 16 wherein the tray comprises a first surface and a second surface and the second electronic card is adjacent a first surface and the first electronic card is adjacent the second electronic card so that the second electronic card is between the tray and the first electronic card.

20. The tray according to claim 16 wherein the first and second electronic cards may be a Subscriber identity module or a memory card.

* * * * *